US011397758B2

(12) United States Patent
Zhicharevich et al.

(10) Patent No.: US 11,397,758 B2
(45) Date of Patent: *Jul. 26, 2022

(54) BROWSE NODE CREATION USING FREQUENT PATTERN MINING

(71) Applicant: eBay Inc., San Jose, CA (US)

(72) Inventors: Alexander Zhicharevich, Givaataim (IL); Giora Simchoni, Bethlehem of Galilee (IL); Arnon Dagan, Kfar Vitkin (IL); Daniel Hurwitz, Kfar Saba (IL)

(73) Assignee: eBay Inc., San Jose, CA (US)

( * ) Notice: Subject to any disclaimer, the term of this patent is extended or adjusted under 35 U.S.C. 154(b) by 15 days.

This patent is subject to a terminal disclaimer.

(21) Appl. No.: 17/064,538

(22) Filed: Oct. 6, 2020

(65) Prior Publication Data
US 2021/0019337 A1   Jan. 21, 2021

Related U.S. Application Data

(63) Continuation of application No. 15/240,841, filed on Aug. 18, 2016, now Pat. No. 10,838,984.

(51) Int. Cl.
*G06F 16/26* (2019.01)
*G06F 16/28* (2019.01)
(Continued)

(52) U.S. Cl.
CPC ........ *G06F 16/285* (2019.01); *G06F 16/2272* (2019.01); *G06F 16/26* (2019.01); *G06F 16/51* (2019.01)

(58) Field of Classification Search
None
See application file for complete search history.

(56) References Cited

U.S. PATENT DOCUMENTS

| 6,397,228 B1 | 5/2002 | Lamburt et al. |
| 7,331,038 B1 | 2/2008 | Snodgrass et al. |

(Continued)

FOREIGN PATENT DOCUMENTS

WO   2018/035179 A1   2/2018

OTHER PUBLICATIONS

How to fix incorrect categorization /placement /browse node, Retrieved from the Internet: <URL:https://sellercentral.amazon.com/forums/message.jspa?messageiD=31311913/, (accessed on Nov. 15, 2016), Seller Forums-Amazon! Services, [Online], 3 pages.

(Continued)

*Primary Examiner* — Thu N Nguyen
(74) *Attorney, Agent, or Firm* — Shook, Hardy & Bacon LLP

(57) ABSTRACT

A browse node page is addressed by its path. As a result, a web crawler may be more likely to find the browse node than the corresponding parameter-based search page. The browse node may be further distinguished from a search result page by the use of a title or header metatag that indicates information about the browse node and distinguishes the browse node from a general search result page. The number of combinations of keywords, categories, and key-value pairs makes the creation of a browse node for every possible combination prohibitive in all but the simplest applications. Methods and systems to identify which search result pages should be converted to browse nodes are disclosed herein.

20 Claims, 15 Drawing Sheets

(51) Int. Cl.
*G06F 16/51* (2019.01)
*G06F 16/22* (2019.01)

(56) References Cited

U.S. PATENT DOCUMENTS

| | | | |
|---|---|---|---|
| 7,603,367 B1 | 10/2009 | Kanter et al. | |
| 7,647,309 B1 | 1/2010 | Bar | |
| 7,953,723 B1 | 5/2011 | Dutton et al. | |
| 8,019,766 B2 | 9/2011 | Chan et al. | |
| 8,117,216 B1* | 2/2012 | Chanda | G06F 16/9038 707/754 |
| 8,301,649 B1 | 10/2012 | Hansen | |
| 8,560,398 B1* | 10/2013 | Gregov | G06Q 30/06 705/26.2 |
| 8,738,733 B1 | 5/2014 | Walters et al. | |
| 8,832,129 B1 | 9/2014 | Hansen | |
| 9,665,900 B1 | 5/2017 | Claeson et al. | |
| 10,387,934 B1 | 8/2019 | Hoover | |
| 10,838,984 B2 | 11/2020 | Zhicharevich et al. | |
| 2004/0073565 A1* | 4/2004 | Kaufman | G06F 16/252 |
| 2005/0102202 A1 | 5/2005 | Linden et al. | |
| 2005/0222987 A1* | 10/2005 | Vadon | G06F 16/907 |
| 2008/0214157 A1 | 9/2008 | Ramer et al. | |
| 2011/0078130 A1 | 3/2011 | Roizen et al. | |
| 2014/0237610 A1 | 8/2014 | Vandervort | |
| 2014/0365507 A1 | 12/2014 | Wissner et al. | |
| 2014/0372956 A1 | 12/2014 | Bisca et al. | |
| 2016/0065627 A1 | 3/2016 | Pead et al. | |
| 2017/0177831 A1 | 6/2017 | Boutin | |
| 2018/0052905 A1 | 2/2018 | Zhicharevich et al. | |

OTHER PUBLICATIONS

Advisory Action received for U.S. Appl. No. 15/240,841, dated Jul. 19, 2019, 3 pages.
Applicant Initiated Interview Summary received for U.S. Appl. No. 15/240,841, dated Nov. 28, 2018, 3 pages.
Final Office Action received for U.S. Appl. No. 15/240,841, dated May 1, 2019, 18 pages.
Non Final Office Action Received for U.S. Appl. No. 15/240,841, dated Mar. 6, 2020, 17 pages.
Non-Final Office Action received for U.S. Appl. No. 15/240,841, dated Oct. 17, 2018, 18 pages.
Non-Final Office Action Received for U.S. Appl. No. 15/240,841, dated Sep. 6, 2019, 18 pages.
Notice Of Allowance received for U.S. Appl. No. 15/240,841, dated Aug. 28, 2020, 8 pages.
Response to Advisory Action Filed on Aug. 12, 2019, for U.S. Appl. No. 15/240,841 dated Jul. 19, 2019, 15 pages.
Response to Final Office Action filed on Jun. 18, 2019 for U.S. Appl. No. 15/240,841, dated May 1, 2019, 14 pages.
Response to Non-Final Office Action filed on Jan. 2, 2019, for U.S. Appl. No. 15/240,841, dated Oct. 17, 2018, 22 pages.
Response to Non-Final Office Action filed on May 20, 2020 for U.S. Appl. No. 15/240,841, dated Mar. 6, 2020, 15 pages.
Response to Non-Final Office Action filed on Nov. 19, 2019 for U.S. Appl. No. 15/240,841 dated Sep. 6, 2019, 15 pages.
Extended European search report Received for European Patent Application No. 17842031.1, dated Mar. 20, 2020, 12 pages.
Response to Extended European Search Report Filed on Aug. 3, 2020, for European Patent Application No. 17842031.1, dated Mar. 20, 2020, 18 pages.
Friedman, "Amazon.com For Dummies", In: "Amazon.com For Dummies", Jan. 30, 2004, 380 pages.
International Report on Patentability received for PCT Application No. PCT/US2017/047041, dated Feb. 28, 2019, 7 pages.
International Search Report received for PCT Application No. PCT/US2017/047041, dated Nov. 6, 2017, 3 pages.
Written Opinion received for PCT Application No. PCT/US2017/047041, dated Nov. 6, 2017, 5 pages.
Communication Pursuant to Article 94(3) EPC received for European Patent Application No. 17842031.1, dated Oct. 22, 2021, 10 pages.

* cited by examiner

| ITEM ID | NAME-VALUE PAIRS |
|---|---|
| 1 | BRAND: SAMSUNG, MODEL:S3, STORAGE: 16GB |
| 2 | BRAND: SAMSUNG, MODEL:S2 |
| 3 | BRAND: SAMSUNG, MODEL:S3 |
| 4 | BRAND: SAMSUNG, OS: ANDROID, STORAGE: 8GB |
| 5 | BRAND: LG, OS: ANDROID, STORAGE: 8GB |

1210

| CREATED BROWSE NODES |
|---|
| BRAND: SAMSUNG |
| MODEL: S3 |
| BRAND: SAMSUNG, MODEL: S3 |
| OS: ANDROID |
| STORAGE: 8GB |
| OS: ANDROID, STORAGE: 8GB |

| NODE ID | NAME-VALUE PAIRS | TITLE |
|---|---|---|
| 1 | BRAND: SAMSUNG | SAMSUNG BRAND SMARTPHONES |
| 2 | MODEL: S3 | S3 MODEL SMARTPHONES |
| 3 | BRAND: SAMSUNG, MODEL: S3 | SAMSUNG S3 SMARTPHONES |
| 4 | OS: ANDROID | ANDROID SMARTPHONES |
| 5 | STORAGE: 8GB | 8GB SMARTPHONES |
| 6 | OS: ANDROID, STORAGE: 8GB | 8GB ANDROID SMARTPHONES |

FIG. 13

BROWSE NODE CREATION USING FREQUENT PATTERN MINING

CROSS-REFERENCE TO RELATED APPLICATIONS

This application claims the benefit of U.S. patent application Ser. No. 15/240,841 filed Aug. 18, 2016, which is hereby incorporated by reference in its entirety.

TECHNICAL FIELD

The subject matter disclosed herein generally relates to the processing of data. Specifically, in some example embodiments, the present disclosure addresses systems and methods for browse node creation using frequent pattern mining.

BRIEF DESCRIPTION OF THE DRAWINGS

Some embodiments are illustrated by way of example and not limitation in the figures of the accompanying drawings.

FIG. 12 is a table illustrating an example set of items and created browse nodes, according to some example embodiments.

FIG. 13 is a table illustrating an example set of browse nodes and titles, according to some example embodiments.

DETAILED DESCRIPTION

Figure 1:
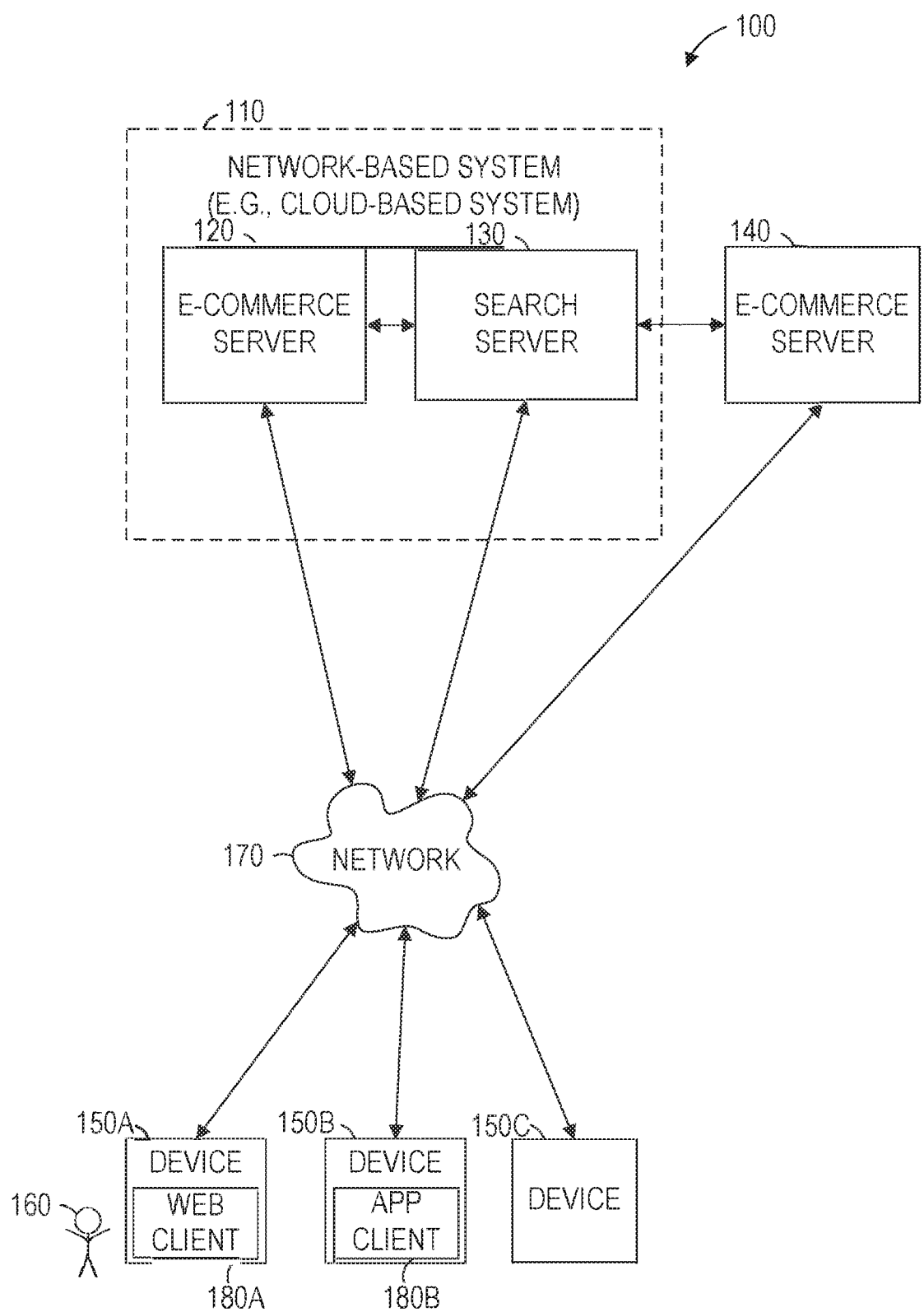
FIG. 1 is a network diagram illustrating a network environment suitable for creating browse nodes using frequent pattern mining, according to some example embodiments.

Example methods and systems are directed to creating browse nodes using frequent pattern mining. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

An aspect is an attribute that can be used to filter search results, stored as a key-value pair. Aspects are distinct from the content of the search result (e.g., text or images displayed in the search result) and from the category of the search result. Categories are organized in a tree structure, with each search result belonging to at most one leaf node of the tree. By contrast, each search result may be associated with multiple aspects. For example, "brand=nike" and "condition=new" may both be associated with a single item. For clarity, the term "aspect type" may be used to refer to the key of the key-value pair and "aspect value" used to refer to the value.

A user may submit a search query to a search engine (e.g., a search application running on an application server). The search engine may process the search query and generate a set of results. Results generated by different search engines for the same search query may be different. For example, one search engine may be geared to providing image results while another is geared to providing shopping results. Continuing with this example, submitting a search query comprising "purse" to the two engines could result in an image of a purse from the first engine and a link to a purse retailer from the second engine.

Search engine results are presented on search result pages and browse node pages. A search result page is generated in response to a specific search and cannot be accessed except through running a search. For example, "http://search-engine.com/search.cgi?key=brand&value=nike" could be a uniform resource locator (URL) that submits the key-value pair of "brand=nike" to a search script of a search engine. The resulting web page would be dynamically created in response to the query, and not accessible through a static URL. In this case, the key-value pair argument is sent as a parameter to the path "search.cgi" in the domain "searchengine.com." By contrast, a browse node page is addressed by its path. For example, "http://searchengine.com/Nike" could be a URL that also provides results for a search for "brand=nike." As a result, a web crawler may be more likely to find the browse node than the corresponding parameter-based search page. In some example embodiments, the browse node is further distinguished by the use of a title or header metatag that indicates information about the browse node and distinguishes the browse node from a general search result page. For example, a general search result page may have a header (e.g., in an <H1> hypertext markup language (HTML) tag) of "search results for brand=nike," while the corresponding browse node may have a header of "Nike Brand Goods." In some example embodiments, the title or header of a browse node is crafted by a human while the title or header of a search result page is automatically generated based on the search criteria.

Automated processes may be used to create browse nodes for search result pages. However, the number of combinations of keywords, categories, and key-value pairs makes the creation of a browse node for every possible combination prohibitive in all but the simplest applications. Methods and systems to identify which search result pages should be converted to browse nodes are disclosed herein.

FIG. 1 is a network diagram illustrating a network environment 100 suitable for creating browse nodes using frequent pattern mining, according to some example embodiments. The network environment 100 includes e-commerce servers 120 and 140, a search server 130, and devices 150A, 150B, and 150C, all communicatively coupled to each other via a network 170. The devices 150A, 150B, and 150C may be collectively referred to as "devices 150," or generically referred to as a "device 150." The e-commerce server 120 and the search server 130 may be part of a network-based system 110. Alternatively, the devices 150 may connect to the search server 130 directly or over a local network distinct from the network 170 used to connect to the e-commerce server 120 or 140. The e-commerce servers 120 and 140, the search server 130, and the devices 150 may each be implemented in a computer system, in whole or in part, as described below with respect to FIGS. 14-15.

The e-commerce servers 120 and 140 provide an electronic commerce application to other machines (e.g., the devices 150) via the network 170. The e-commerce servers 120 and 140 may also be connected directly to, or integrated with, the search server 130. In some example embodiments, one e-commerce server 120 and the search server 130 are part of a network-based system 110, while other e-commerce servers (e.g., the e-commerce server 140) are separate from the network-based system 110. The electronic commerce application may provide a way for users to buy items directly from and sell items directly to each other, to buy from and sell to the electronic commerce application provider, or both.

Also shown in FIG. 1 is a user 160. The user 160 may be a human user (e.g., a human being), a machine user (e.g., a computer configured by a software program to interact with the devices 150 and the e-commerce or search server 120, 130, 140), or any suitable combination thereof (e.g., a human assisted by a machine or a machine supervised by a human). The user 160 is not part of the network environment 100, but is associated with the devices 150 and may be a user of the devices 150. For example, the device 150 may be a sensor, a desktop computer, a vehicle computer, a tablet computer, a navigational device, a portable media device, or a smart phone belonging to the user 160.

In some example embodiments, the search server 130 receives a search query from a user. The search server 130 executes the search query as provided by the user or identifies a corresponding browse node. The search query is sent to the e-commerce server 120 or 140, which generates a result list for the user.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIGS. 14-15. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, database, or device, and the functions described herein for any single machine, database, or device may be subdivided among multiple machines, databases, or devices.

The network 170 may be any network that enables communication between or among machines, databases, and devices (e.g., the e-commerce or search server 120, 130, 140 and the devices 150). Accordingly, the network 170 may be a wired network, a wireless network (e.g., a mobile or cellular network), or any suitable combination thereof. The network 170 may include one or more portions that constitute a private network, a public network (e.g., the Internet), or any suitable combination thereof.

Figure 2:
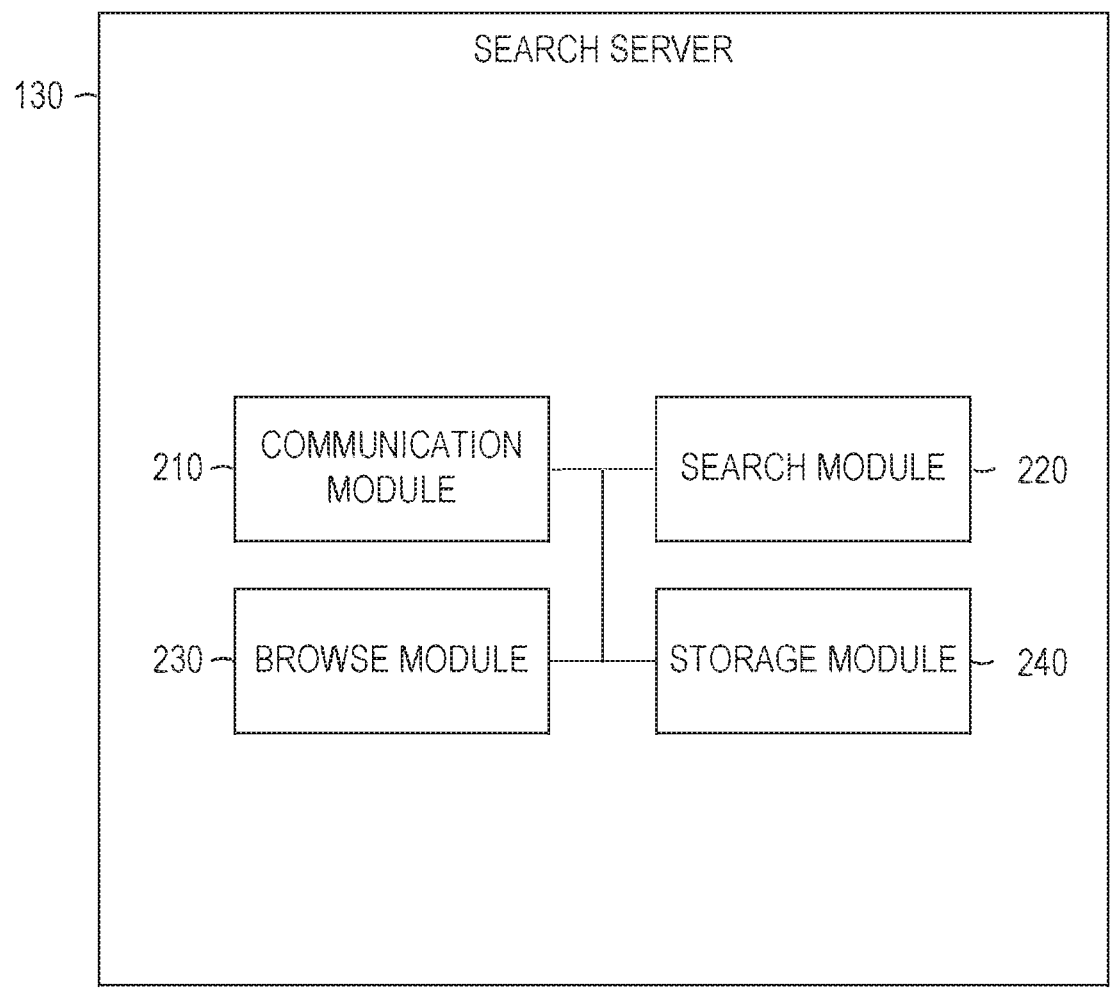
FIG. 2 is a block diagram illustrating components of a search server suitable for creating browse nodes using frequent pattern mining, according to some example embodiments.

FIG. 2 is a block diagram illustrating components of the search server 130, according to some example embodiments. The search server 130 is shown as including a communication module 210, a search module 220, a browse module 230, and a storage module 240, all configured to communicate with each other (e.g., via a bus, shared memory, a switch, or application programming interfaces (APIs)). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices. In some example embodiments, modules are implemented using clusters of hardware computers powered by Apache™ Hadoop®, allowing for scalable and parallelizable implementations of the methods described herein.

The communication module 210 is configured to send and receive data. For example, the communication module 210 may receive a search query from the device 150. Upon receiving a search query, the communication module 210 may send the search query to the browse module 230 to determine if the search query corresponds to a browse node.

The search module 220 is configured to evaluate search queries. In some example embodiments, evaluating a search query includes forwarding the search query to the e-commerce server 120 or 140. In other example embodiments, evaluating a search query comprises searching a database on the search server 130 for results.

A search result may have both aspects and categories. As an example, consider a search result that is a listing for a particular pair of shoes. The shoes may belong to the category of Clothing, while the listing may have the aspect of being an auction. As another example, consider a search result that is a web page including an article about economic policy. The article may belong to the category of Economics, while the mode of presentation of the article—an aspect of the search result—is a web page.

The browse module 230 is configured to look up a browse node for an input query and provide the browse node in response to the query. For example, the browse module 230 may receive the search query from the communication module 210, and access a database to identify the browse node. Building on the example above, a search for "nike shoes" may be replaced by a browse node containing all items in the "Clothing>Shoes" category with the aspect "brand=nike." The title of the browse node may be "Shoes by Nike." The communication module 210 may send a query associated with the browse node to the e-commerce server 120 or 140 for generation of search results to be sent to the user.

The storage module 240 may store data regarding prior searches by the querying user and other users, store browse node lookup data for the browse module 230, or both. For example, historical query data, user modeling data, context modeling data, and query modeling data may all be stored by the storage module 240. Additionally or alternatively, the storage module 240 may access data storage on other devices, such as an external database.

Figure 3:
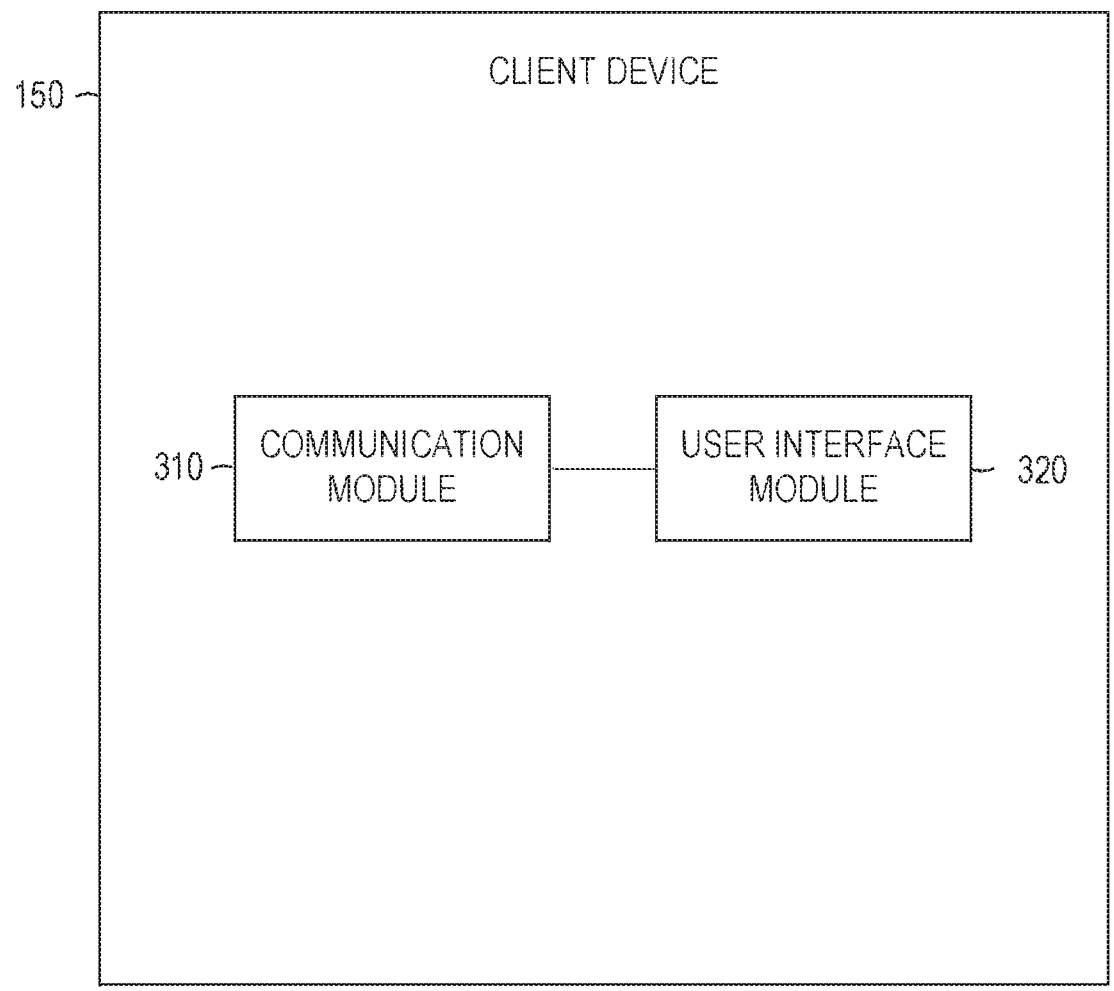
FIG. 3 is a block diagram illustrating components of a client device suitable for submitting a query and displaying results, according to some example embodiments.

FIG. 3 is a block diagram illustrating components of a client device (e.g., the device 150) suitable for submitting a query and displaying results, according to some example embodiments. The device 150 is shown as including a communication module 310 and a user interface module 320, configured to communicate with each other (e.g., via a bus, shared memory, or a switch).

The communication module 310 may communicate with the e-commerce server 120 or 140, the search server 130, or any suitable combination thereof. Information received via the communication module 310 may be presented (e.g., displayed on a display device) via the user interface module 320. Information may be selected or search queries may be entered by a user using a user interface presented by the user interface module 320. The search queries may be communicated to the e-commerce or search server 120, 130, 140 via the communication module 310. The communication module 310 may receive a response from the e-commerce or search server 120, 130, 140 that includes a set of results. Search results may be presented to the user by the user interface module 320. For example, the search results may be presented in a list view or a gallery view.

Figure 4:
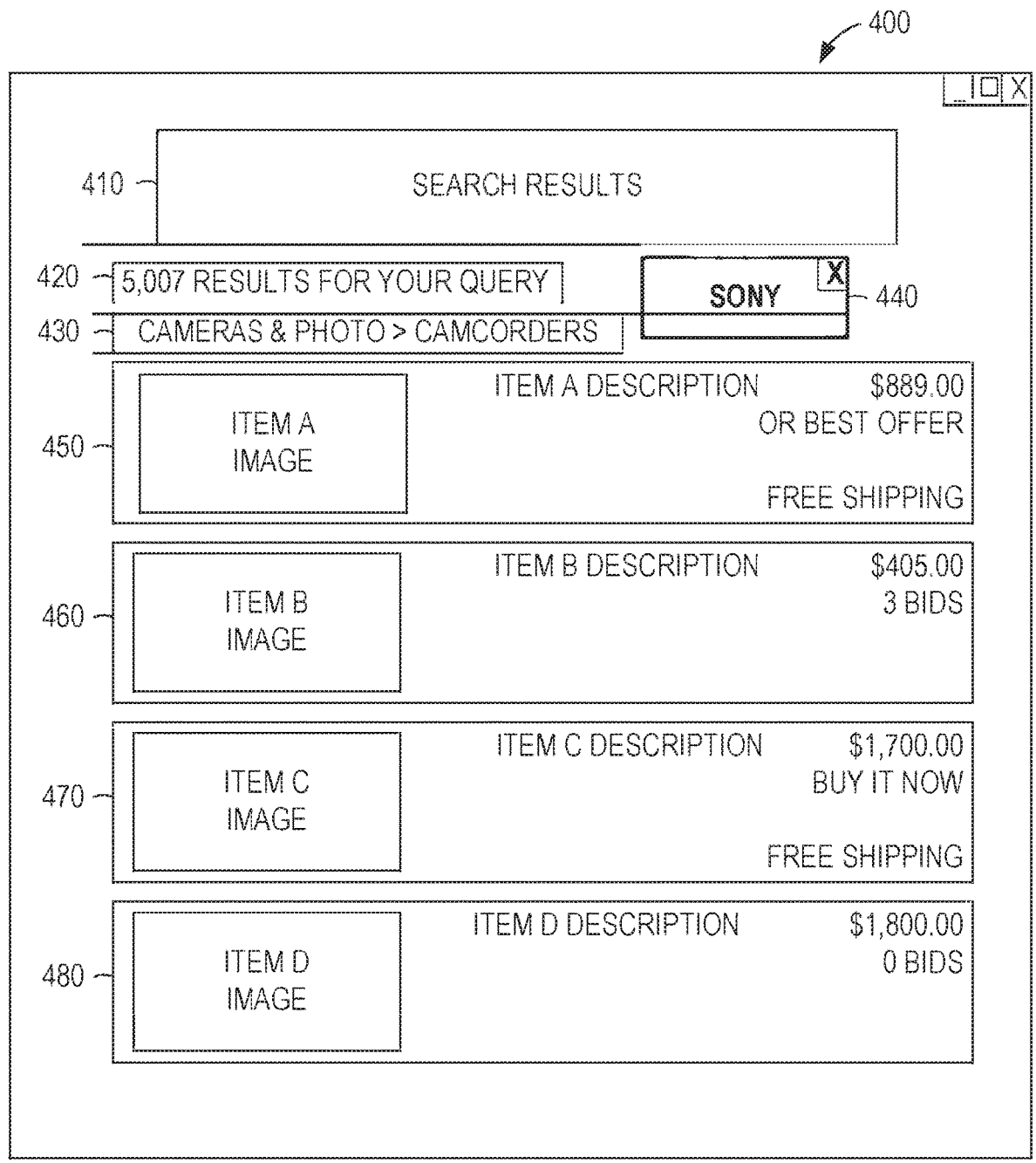
FIG. 4 is a block diagram illustrating a user interface suitable for displaying search results, according to some example embodiments.

FIG. 4 is a block diagram illustrating a user interface 400 suitable for presenting search results, according to some example embodiments. As can be seen in FIG. 4, the user interface 400 includes a title 410, "Search Results"; a result count 420; a category 430; an aspect 440; and four search results 450-480.

The user interface 400 may be displayed in response to a user query. For example, if the user enters a query for "sony camera" on a device 150, the query may be transmitted from the device 150 to the search server 130. The search server 130 determines that the query should be processed by the e-commerce server 120 or 140 without change and forwards the query to the e-commerce server 120 or 140. The e-commerce server 120 or 140 executes the query and sends the search results 450-480 to the device 150 for display to the user.

Each search result 450-480 may be operable to view additional information about the search result. For example, a search result may be an item for sale and the initial search result screen may show an image of the item and a label. Clicking on or otherwise activating the image of the item may result in a new page being displayed that shows additional information about the item, such as an item description, additional images, a price, and so on.

The results may include items, events, locations, people, and so on. Items may be items for sale or items that are wanted for purchase. Events may be concerts, festivals, movies, sporting events, and the like. Locations may be monuments, stores, gas stations, restaurants, stadiums, and the like. People may be friends of the user, celebrities, or other people. In some example embodiments, one or more of the items, events, locations, or people displayed is chosen based on an advertising fee paid.

Figure 5:
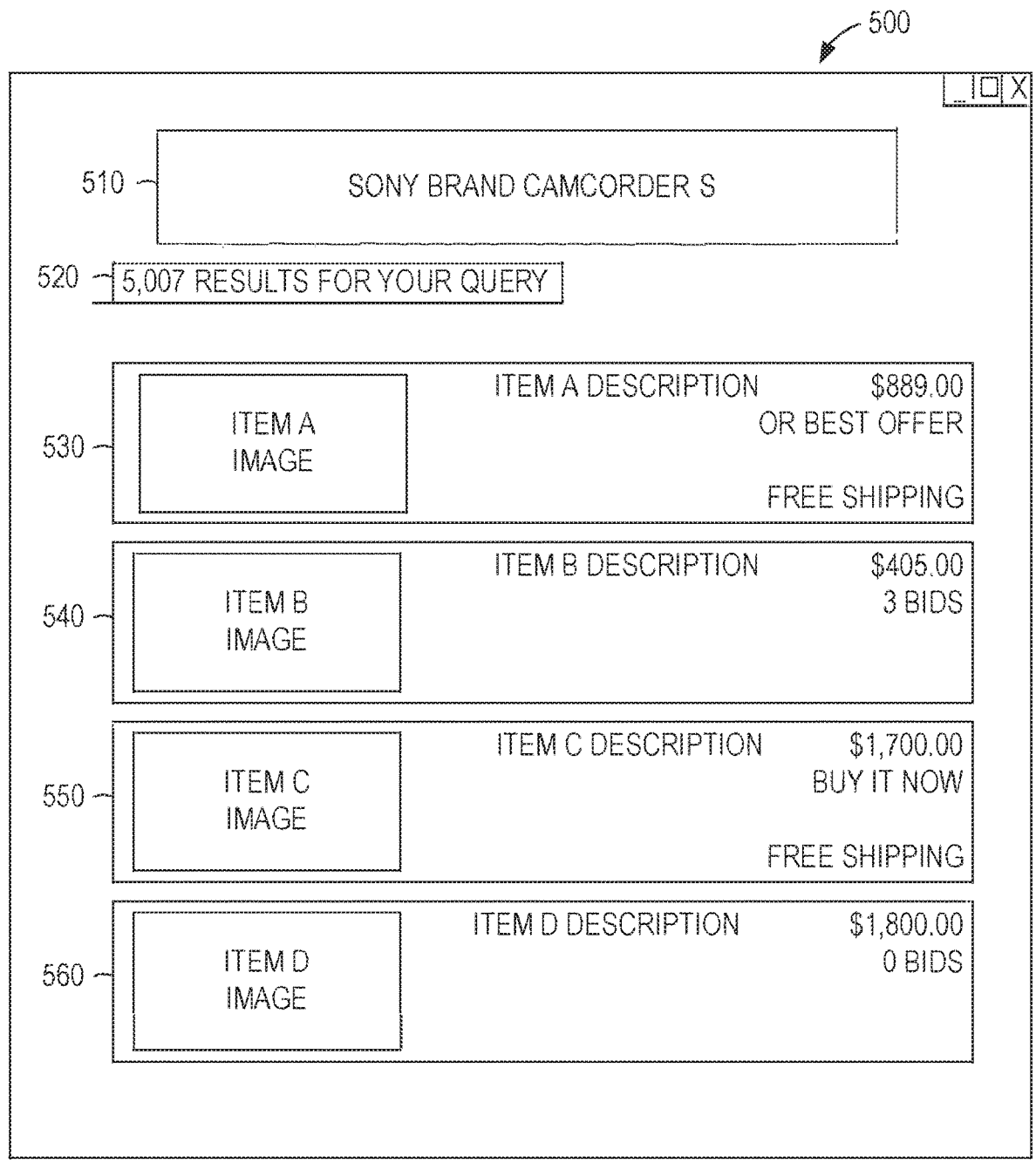
FIG. 5 is a block diagram illustrating a user interface suitable for displaying a browse node, according to some example embodiments.

FIG. 5 is a block diagram illustrating a user interface 500 suitable for displaying a browse node, according to some example embodiments. As can be seen, the user interface 500 includes a title 510, "Sony Brand Camcorders"; a result count 520; and four search results 530-560.

The user interface 500 may be displayed in response to a user query. For example, if the user enters a query for "sony camera" on a device 150, the query may be transmitted from the device 150 to the search server 130. The search server 130 determines that the query should be responded to with a browse node and sends a request for the browse node to the e-commerce server 120 or 140. The e-commerce server 120 or 140 responds to the request by sending the browse node (including the search results 530-560) to the device 150 for display to the user. As can be seen by comparison of the user interface 500 with the user interface 400, the generic title 410 of "Search Results" has been replaced by the title 510 of "Sony Brand Camcorders," which is specific to the query associated with the browse node.

Figure 6:
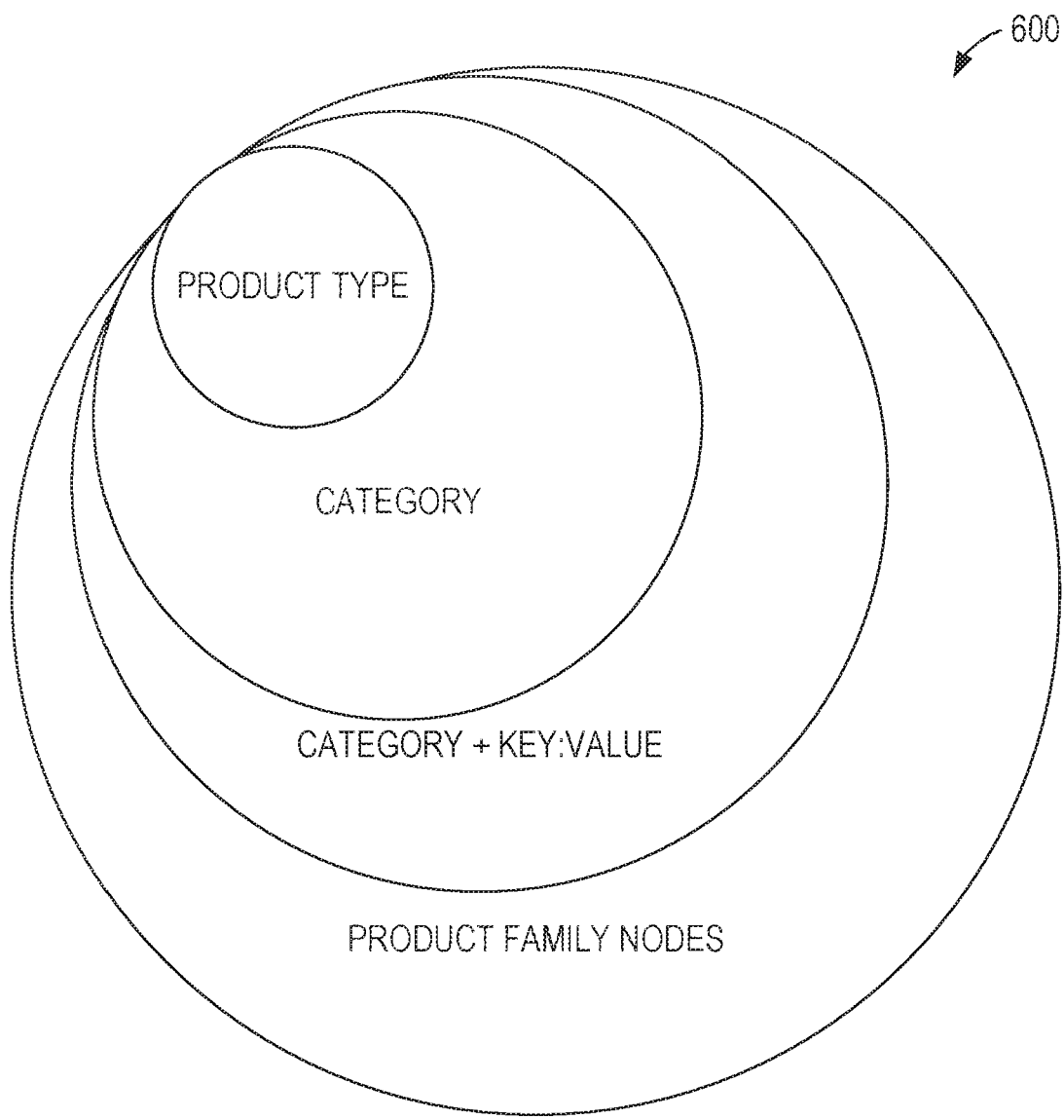
FIG. 6 is a block diagram illustrating a hierarchy of browse nodes, according to some example embodiments.

FIG. 6 is a block diagram 600 illustrating a hierarchy of browse nodes suitable when creating browse nodes using pattern mining, according to some example embodiments. A browse node is a particular grouping of items that can be browsed by users. In some example embodiments, a browse node is distinguished from a search result page by virtue of HTML tags in the served page, features of the URL of the served page, or both. For example, a search result page may have a URL that indicates the search query terms as arguments to a CGI script while a browse node page may have a URL that indicates the search query terms as part of the path portion of the URL. As another example, a search result page may have a general title (e.g., using a <TITLE> or <H1> HTML tag) that is used for many search queries while a browse node page may have a title that specifically reflects the browse node. As shown in the block diagram 600, browse nodes may exist at different levels in the hierarchy. At the highest level, a user may view information for an entire product type. From the product type view, the user may drill down into categories and sub-categories. Within a category or sub-category, further browse nodes may exist for particular aspect values and combinations. For example, a browse node may be created for "brand=sony," "color=black," or both together. Due to the combinatorial explosion caused by the number of possible combinations of distinct aspects, it is often desirable to avoid creating browse nodes for every possible combination of aspects. For example, if aspects for brand, color, and size exist, and each aspect has 10 possible values (by no means an upper bound), then 1000 different browse nodes for the various combinations would need to be created in order to provide a browse node for each combination. Selective creation of browse nodes may provide most of the benefit with minimal cost. For example, if 10 browse nodes cover 80% of user interests, limiting the browse nodes to those 10 would provide 80% of the benefit with 1% of the cost of creating all 1000 browse nodes.

The aspect-limited browse nodes are further refined by product family nodes. A product family node contains a curated list of closely related items. For example, an aspect limited browse node for the category of "Cameras &

Photo>Film Photography>Film Cameras" with "brand=sony" and "color=black" would contain all items matching those criteria. As another example, a product family node for "Amazing Film Cameras" would contain a set of items fitting that criterion in the judgment of a curator.

The creation of browse nodes for particular category/aspect combinations may provide for a better browse experience. For example, browse nodes may be presented to users differently from ordinary aspect filters, allowing users to more easily find popular aspect sets for the currently browsed category. Additionally, browse nodes may improve ranking of the site in other search engines. For example, if a site provide a natural way for a web crawler to find every browse node, the browse node page for a particular category/aspect is likely to have a higher page rank than a search result page for the same combination.

Figure 7:
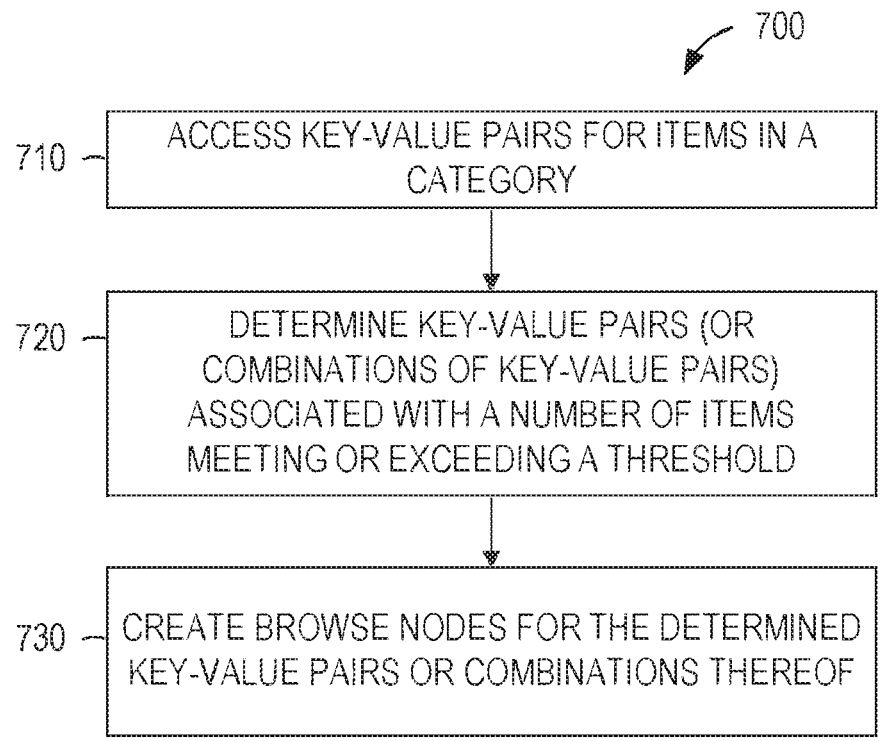
FIG. 7 is a flowchart illustrating operations of an application server in performing a method of creating browse nodes using frequent pattern mining, according to some example embodiments.

FIG. 7 is a flowchart illustrating operations of a search server 130 in performing a method 700 of creating browse nodes using frequent pattern mining, according to some example embodiments. Operations in the method 700 may be performed by the search server 130, using modules described above with respect to FIG. 2.

In operation 710, the browse module 230 accesses key-value pairs for items in a category. For example, the key-value pairs shown in FIG. 12 may be accessed.

The browse module 230 determines, in operation 720, key-value pairs (or combinations of key-value pairs) associated with a number of items meeting or exceeding a threshold. For example, of the five items shown in FIG. 12, four are associated with the key-value pair "brand=Samsung." Accordingly, if the threshold is two, then "brand=Samsung" will be one of the determined key-value pairs. Similarly, two of the items in FIG. 12 are associated with both "model=S3" and "brand=Samsung." Accordingly, the key-value pairs will be determined as individually meeting the threshold. Additionally, the combination of key-value pairs "brand=Samsung; model=S3" will also be determined as meeting the threshold.

In operation 730, the browse module 230 creates browse nodes for one or more of the identified key-value pairs (or combinations thereof). Continuing with the example above, browse nodes may be created for any or all of "brand=Samsung," "model=S3," and "brand=Samsung; model=S3."

Figure 8:
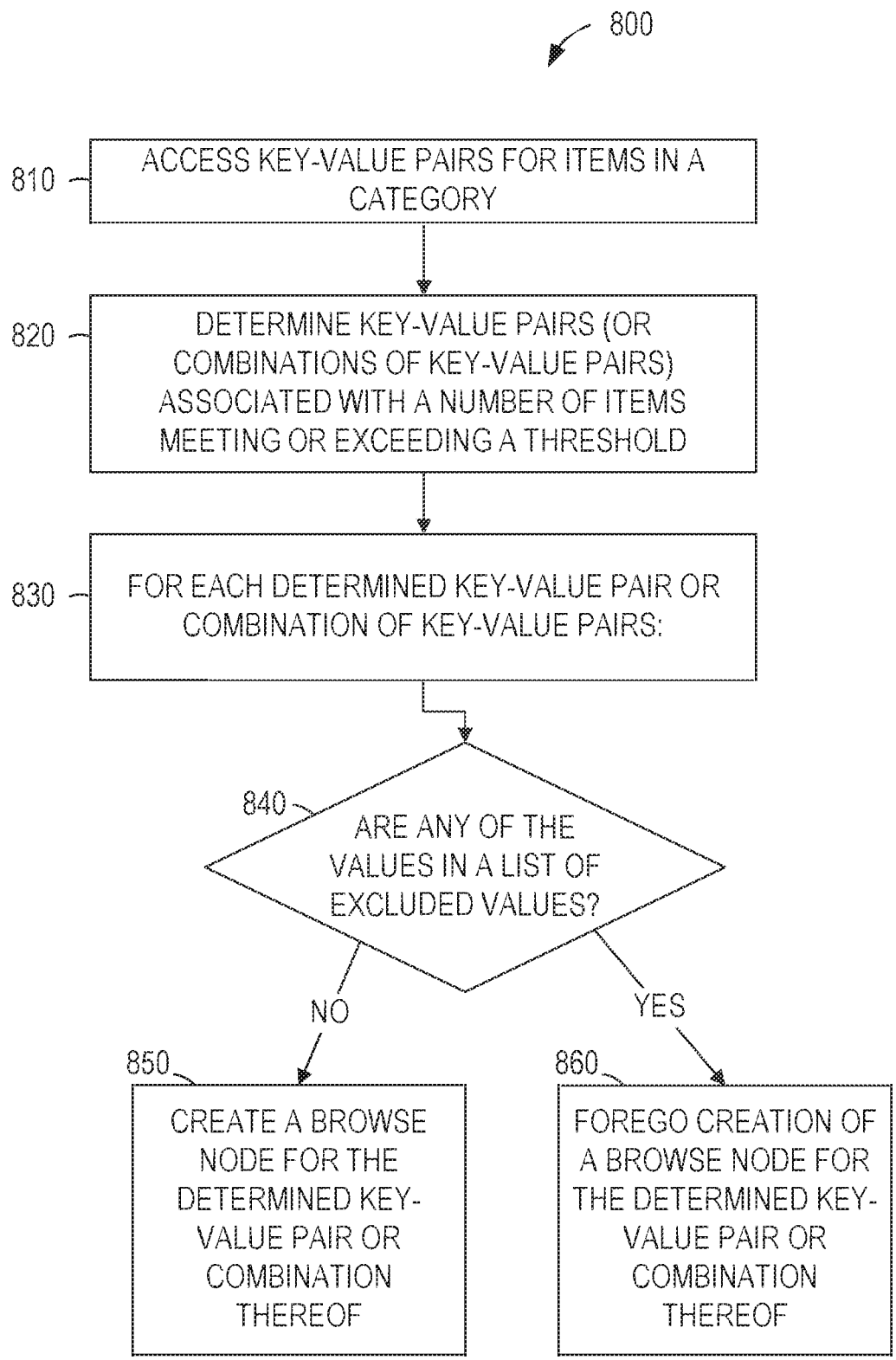
FIG. 8 is a flowchart illustrating operations of an application server in performing a method of creating browse nodes using frequent pattern mining, according to some example embodiments.

FIG. 8 is a flowchart illustrating operations of a search server 130 in performing a method 800 of creating browse nodes using frequent pattern mining, according to some example embodiments. Operations in the method 800 may be performed by the search server 130, using modules described above with respect to FIG. 2. Operations 810 and 820 may be performed in a manner similar to operations 710 and 720, described above.

In operation 830, a loop is begun for each key-value pair (or combination of key-value pairs) determined in operation 820. Thus, appropriate ones of operations 840-860 are performed for each such determined key-value pair or combination thereof. For convenience, each such determined key-value pair or combination thereof will be referred to as a set of key-value pairs, having one or more members.

The browse module 230 determines if any of the values in the set of key-value pairs are in a list of excluded values, in operation 840. For example, values corresponding to the category and values that are unlikely to be meaningful (e.g., "junk," "temp," or "foo") may be excluded.

In operation 850, if none of the values are in the list of excluded values, a browse node is created for the set of key-value pairs. However, in operation 860, if one or more of the values are in the list of excluded values, the browse node is not created for the set of key-value pairs.

Figure 9:
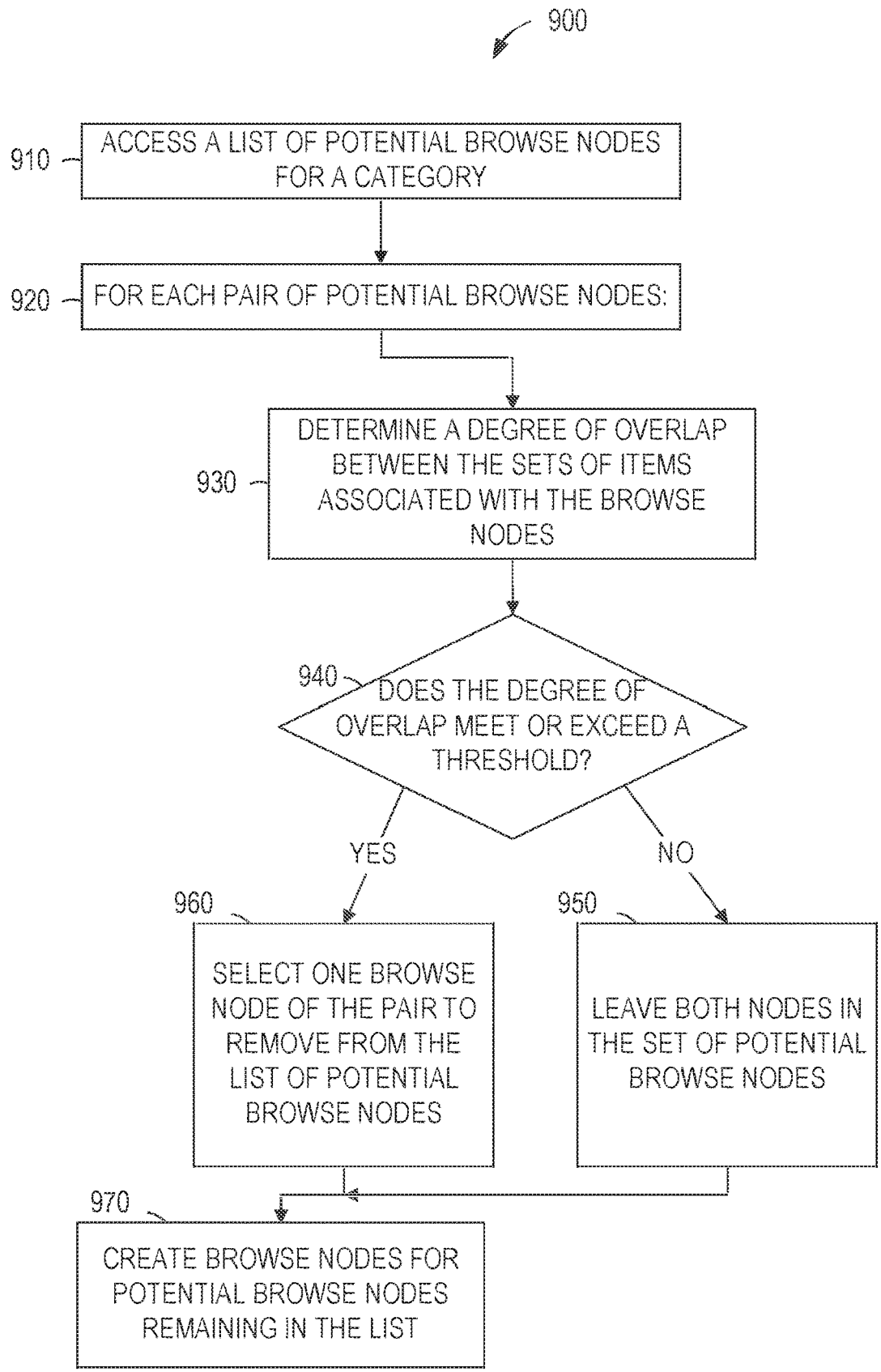
FIG. 9 is a flowchart illustrating operations of an application server in performing a method of creating browse nodes using frequent pattern mining, according to some example embodiments.

FIG. 9 is a flowchart illustrating operations of a search server 130 in performing a method 900 of creating browse nodes using frequent pattern mining, according to some example embodiments. Operations in the method 900 may be performed by the search server 130, using modules described above with respect to FIG. 2.

In operation 910, the browse module 230 accesses potential browse nodes for a category. For example, each set of key-value pairs resulting from operation 720 may define a potential browse node and be accessed in operation 910.

The browse module 230 begins a loop over each pair of potential browse nodes in operation 920. Accordingly, appropriate ones of operations 930-960 are performed for each potential browse node pair. Considering the data shown in FIG. 12, six potential browse nodes are identified, resulting in 15 browse node pairs.

In operation 930, the browse module 230 determines a degree of overlap between items associated with the two potential browse nodes. The degree of overlap may be determined as a count of items, as a percentage of the larger set of items, as a percentage of the smaller set of items, or any suitable combination thereof. For example, referring to the first two potential browse nodes of FIG. 12, items 1-4 are associated with the potential browse node for "brand=Samsung" and items 1 and 3 are associated with the potential browse node for "model=S3." Accordingly, the degree of overlap is two items, 50% of the larger item set, or 100% of the smaller item set.

In operation 940, the browse module 230 compares the degree of overlap with a threshold to determine if the threshold is met or exceeded. The threshold may be defined in terms of a number of items or a percentage. For example, if the threshold is 75% of the smaller item set, it would be met for the pair of "brand=Samsung" and "model=S3" in FIG. 12. If the threshold is met, processing continues with operation 960. Otherwise, processing continues with operation 950.

In operation 950, the degree of overlap does not meet the threshold and both browse nodes are left in the list of potential browse nodes. However, in operation 960, the degree of overlap does meet the threshold and one of the potential browse nodes is removed from the list. For example, the browse node having the smaller set of associated items may be removed from the list. In some example embodiments, a configurable set of cascading rules is applied to determine which browse node is removed and which survives (i.e., is not removed). An administrator may select the criteria to be applied, either sequentially or using weights. For example, the browse node having the larger number of aspect key-values may be the survivor, but if that number is equal, the browse node having the larger number of associated items survives, and if the two browse nodes are still tied, the first node alphabetically survives. As another example, the average popularity of items in the browse node may be given a 25% weight, the average revenue of items in the browse node a 25% weight, the number of aspect key-values a 10% weight, and the number of associated items a 40% weight. In this example, the browse node have the highest weighted score would be the survivor.

In operation 970, after the loop has completed, browse nodes are created for the potential browse nodes remaining in the list. For example, applying the threshold of 75% of the smaller set of items to the data in FIG. 12 would result in "model=S3" and "brand=Samsung; model=S3" being removed from the list due to excessive overlap with "brand=Samsung." The three remaining potential browse nodes have only 50% overlap with "brand=Samsung" and thus would not be removed by comparison with that potential browse node. However, "OS=Android," "storage=8 GB," and "OS=Android; storage=8 GB" have 100% overlap. Accordingly, only one of the three potential browse nodes would be created. In some example embodiments, the potential browse node with the greatest number of key-value pairs is selected. Thus, "brand=Samsung" and "OS=Android; storage=8 GB" would be the two browse nodes created in this example embodiment based on the data in FIG. 12.

Figure 10:
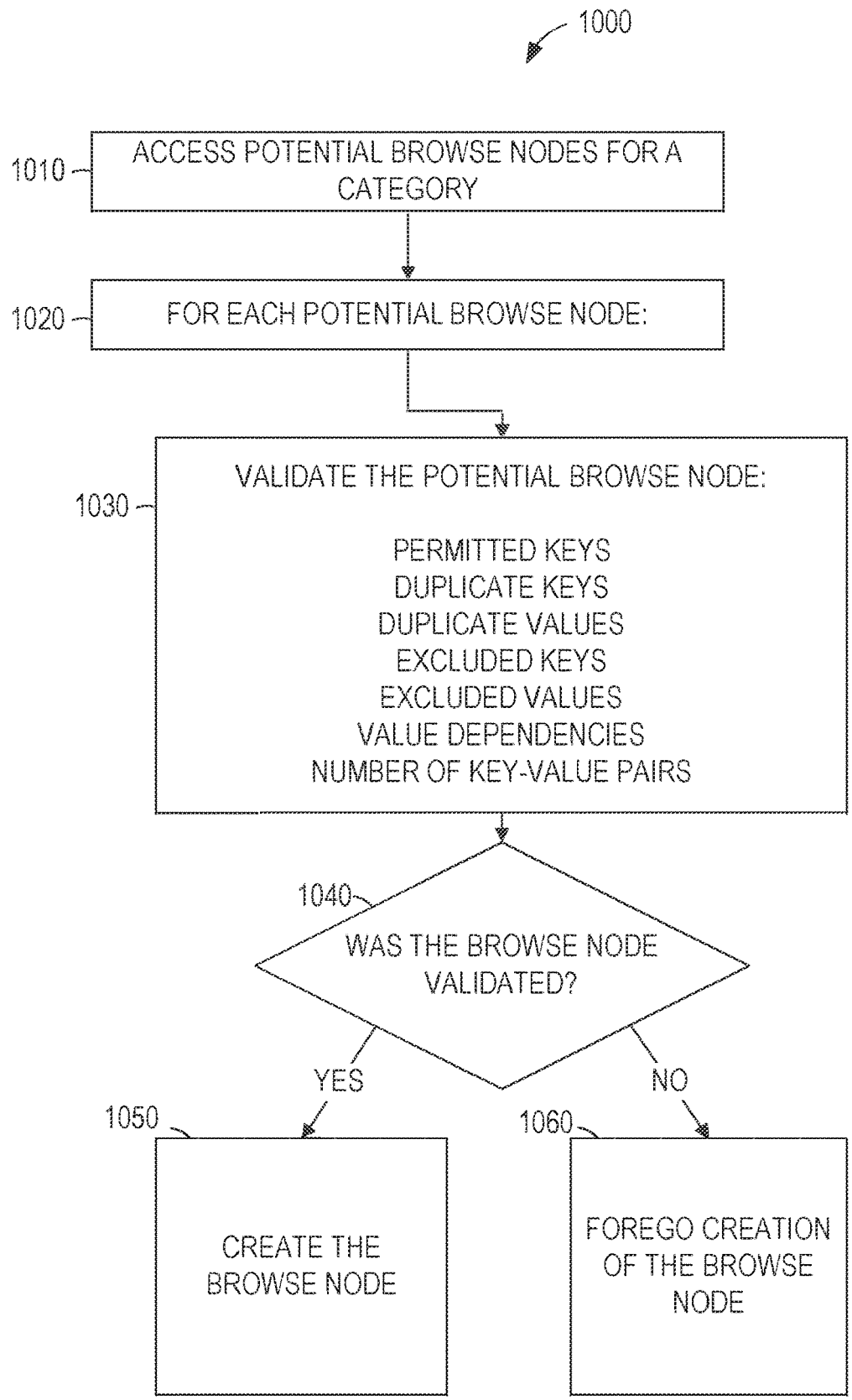
FIG. 10 is a flowchart illustrating operations of an application server in performing a method of creating browse nodes using frequent pattern mining, according to some example embodiments.

FIG. 10 is a flowchart illustrating operations of a search server 130 in performing a method 1000 of creating browse nodes using frequent pattern mining, according to some example embodiments. Operations in the method 1000 may be performed by the search server 130, using modules described above with respect to FIG. 2.

In operation 1010, the browse module 230 accesses potential browse nodes for a category. The browse module 230 initiates a loop over the potential browse nodes, in operation 1020. Thus, appropriate ones of operations 1030-1060 are performed for each of the potential browse nodes.

In operation 1030, the potential browse node is validated to determine if the potential browse node should be created. Different criteria and combinations thereof are used in different example embodiments.

In some example embodiments, a permitted key check is performed. To check for permitted keys, the keys in the key-value pairs for the potential browse node are compared to a list of permitted keys. If all of the keys are in the permitted list, the permitted key check succeeds. If one or more of the keys are not in the permitted list, the permitted key check fails.

In some example embodiments, a duplicate keys check is performed. To check for duplicate keys, the keys in the key-value pairs for the potential browse node are compared to each other. If any key appears twice, the duplicate key check fails. Otherwise, the duplicate key check succeeds.

In some example embodiments, a duplicate values check is performed. To check for duplicate values, the values in the key-value pairs for the potential browse node are compared to each other. If any value appears twice, the duplicate value check fails. Otherwise, the duplicate value check succeeds.

In some example embodiments, an excluded keys check is performed. To check for excluded keys, the keys in the key-value pairs for the potential browse nodes are compared to keys in a list of excluded keys. If no key for the potential browse node appears in the list of excluded keys, the excluded keys check succeeds. Otherwise, the excluded keys check fails.

In some example embodiments, an excluded values check is performed. To check for excluded values, the values in the key-value pairs for the potential browse nodes are compared to values in a list of excluded values. If no value for the potential browse node appears in the list of excluded values, the excluded values check succeeds. Otherwise, the excluded values check fails.

In some example embodiments, a value dependencies check is performed. To check for excluded value relationships, the key-value pairs for the potential browse nodes are compared to patterns of key-value pairs that are invalid. For example, in the category of "jewelry," a "metal purity" key may have valid values for silver and gold (e.g., 14K), but not be meaningful for bronze or pewter. Accordingly, browse nodes having a key-value pair of "metal=bronze" and a key for "metal purity" are undesirable. Thus, if the key-value pairs for the potential browse node match a pattern of invalid key-value pairs, the value dependencies check fails. Otherwise, the value dependencies check succeeds.

The value dependencies check may also exclude key-value pairs when a particular other key is not present. For example, if the "metal purity" key only has meaning when the "metal" key is present, the "metal purity" key is excluded if the "metal" key is not present.

In some example embodiments, a number of key-value pairs check is performed. To perform this check, the number of key-value pairs for the potential browse node is compared with a range of allowable numbers of key-value pairs. For example, browse nodes with between 1 and 4 key-value pairs, between 2 and 5 key-value pairs, or some other range may be preferred. If the number of key-value pairs for the potential browse node is in the range of allowable numbers of key-value pairs, the check succeeds. Otherwise, the check fails.

Once the checks implemented for the particular embodiment are performed, the browse module 230 checks, in operation 1040, to determine if the potential browse node was validated. A potential browse node is validated only if it passes all applicable checks. In operation 1050, if the potential browse node was validated, a browse node is created for the potential browse node. In operation 1060, if the potential browse node failed validation, no browse node is created for the potential browse node.

Figure 11:
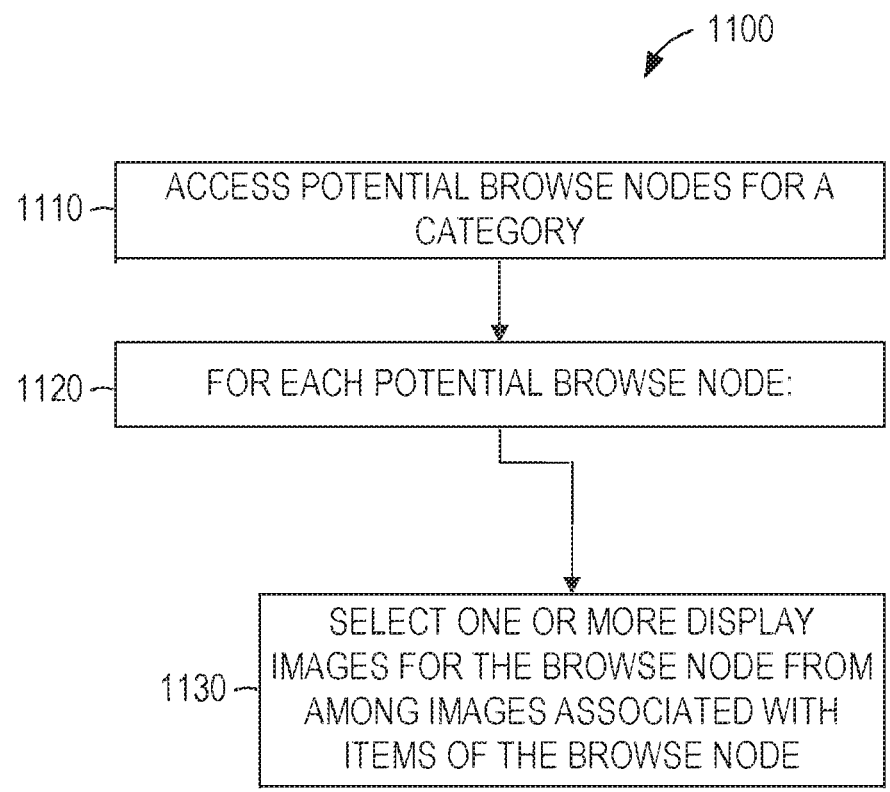
FIG. 11 is a flowchart illustrating operations of an application server in performing a method of creating browse nodes using frequent pattern mining, according to some example embodiments.

FIG. 11 is a flowchart illustrating operations of a search server 130 in performing a method 1100 of creating browse nodes using frequent pattern mining, according to some example embodiments. Operations in the method 1100 may be performed by the search server 130, using modules described above with respect to FIG. 2.

In operation 1110, the browse module 230 accesses potential browse nodes for a category. The browse module 230 initiates a loop over the potential browse nodes, in operation 1120. Thus, operation 1130 is performed for each of the potential browse nodes.

In operation 1130, the browse module 230 selects one or more display images for the potential browse node from among images associated with items associated with the potential browse node. For example, twelve items may be associated with a particular potential browse node by virtue of being associated with the same key-value pairs as the potential browse node. Each of the twelve items is associated with a set of images (e.g., an average of 1.5 images each, 18 images in total). One or more of the images from the combined set are selected in operation 1130 to be directly associated with the potential browse node. For example, once the browse node is created, a selected image may be displayed at the top of the browse node page. As another example, a page with links to multiple browse nodes may be created, with each browse node represented by a selected image.

In various example embodiments, various methods of image selection are used. For example, an image associated with the most items in the browse node may be selected. As another example, a random image associated with an item in the browse node may be selected. In some example embodiments, a database stores information about the images and the information about the images is used to allow or disallow corresponding images. For example, the creator of the image may have granted or denied permission to use the image for purposes other than direct presentation with the item. Accordingly, the permission may be respected by excluding or including the image in the set of possible images to associate with the browse node, as appropriate.

Additionally or alternatively, image quality metrics may be used as part of the selection process. For example, a degree of contrast between a foreground object and a background object can be automatically calculated. Images having a degree of contrast below a threshold may be excluded from consideration. The image having the highest degree of contrast may be selected.

In some example embodiments, image quality metrics are applied using a classification model trained using machine learning algorithms. The model is trained on a learning set of images annotated as either "good" or "bad." The resulting model is able to provide a probability of "goodness" for input images. In this way, the output probability from the model can be used to determine the image associated with the browse node that is the most likely to be "good."

FIG. 12 depicts a table 1210 of an example set of items and associated key-value pairs and a list 1220 of example corresponding created browse nodes. The data shown in the table 1210 may be accessed by the storage module 240 for the browse module 230. The table 1210 includes a unique identifier for each of five items and a set of key-value pairs for each of the five items. The list 1220 identifies six created browse nodes by the corresponding sets of key-value pairs.

FIG. 13 depicts a table 1310 illustrating an example set of browse nodes and titles, according to some example embodiments. The data in the table 1310 includes, for each browse node, a unique identifier, a set of associated key-value pairs, and a title.

While the above description of the present invention uses, by way of example, items in an online marketplace, other kinds of search that use aspects may also make use of the described methodologies. For example, web pages may have aspects of date of creation, date of last modification, size, author, and topic. Some search engines categorize web pages (e.g., to provide a drill-down interface that allows users to find pages through a category hierarchy). Accordingly, search queries for categorized web pages may be improved by identifying aspects of web pages that are popular for the particular category and creating browse nodes for those aspects and aspect combinations. The created browse nodes may be presented in a user interface as part of the category hierarchy, even though the aspects are not part of the category hierarchy from a data perspective. Similar benefits accrue from local hard drive file searches, email archive searches, and the like.

According to various example embodiments, one or more of the methodologies described herein may facilitate the creation of browse nodes using data mining. Hence, one or more of the methodologies described herein may facilitate search engine optimization, which further facilitates a user of a general search engine to find desired items without first entering search queries for an online marketplace or other specialized search engine. For example, one or more of the methodologies described herein may facilitate retrieval and presentation of results of interest to a user without requiring the user to explicitly craft a series of queries.

When these effects are considered in aggregate, one or more of the methodologies described herein may obviate a need for certain efforts or resources that otherwise would be involved in searching. Efforts expended by a user in identifying relevant queries may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Modules, Components and Logic

Certain embodiments are described herein as including logic or a number of components, modules, or mechanisms. Modules may constitute either software modules (e.g., code embodied on a non-transitory machine-readable medium) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Software Architecture

Figure 14:
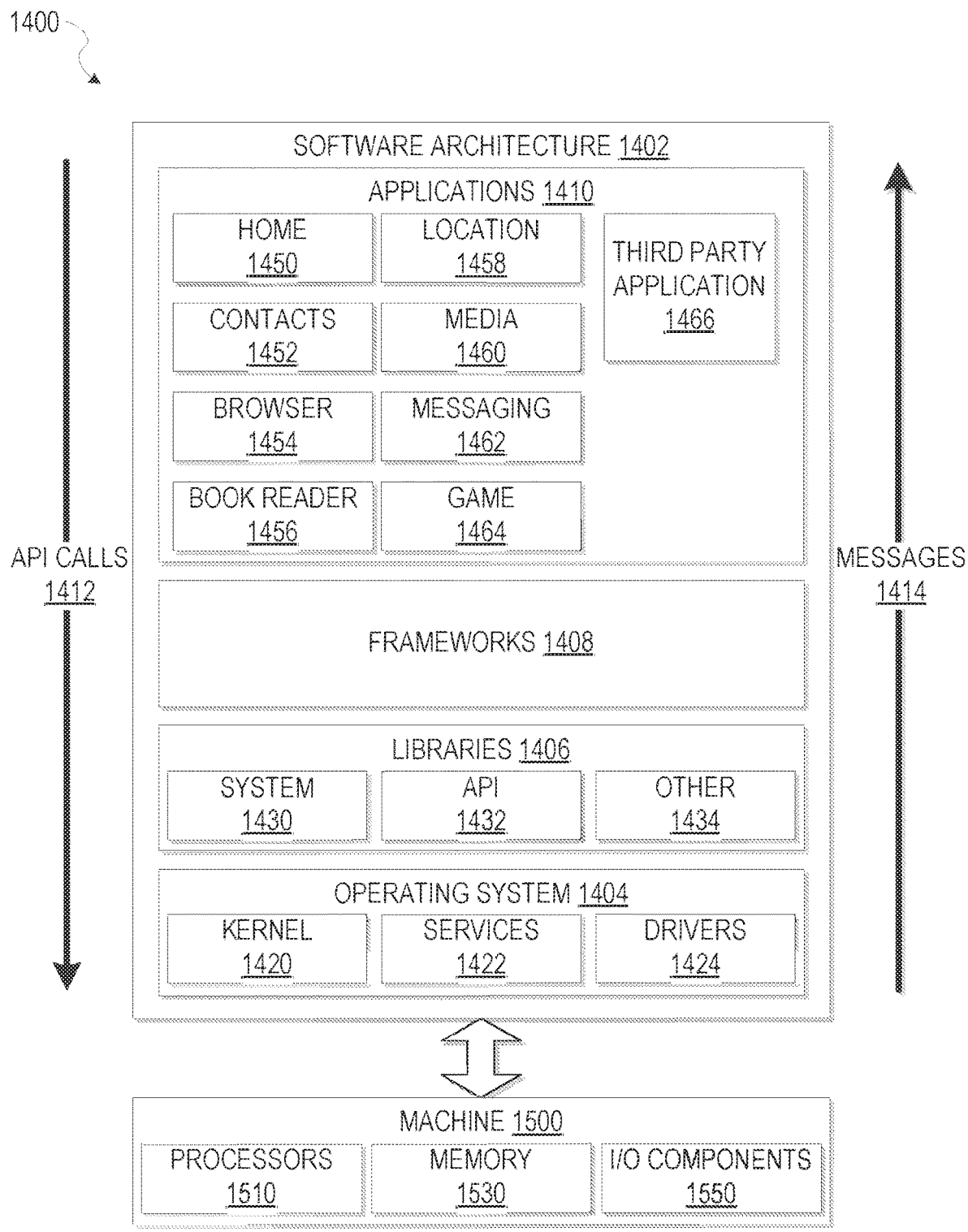
FIG. 14 is a block diagram illustrating an example of a software architecture that may be installed on a machine, according to some example embodiments.

FIG. 14 is a block diagram 1400 illustrating an architecture of software 1402, which may be installed on any one or more of the devices described above. FIG. 14 is merely a non-limiting example of a software architecture, and it will be appreciated that many other architectures may be implemented to facilitate the functionality described herein. The software architecture 1402 may be implemented by hardware such as a machine 1500 of FIG. 15 that includes processors 1510, memory 1530, and I/O components 1550. In this example architecture, the software 1402 may be conceptualized as a stack of layers where each layer may provide a particular functionality. For example, the software 1402 includes layers such as an operating system 1404, libraries 1406, frameworks 1408, and applications 1410. Operationally, the applications 1410 invoke application programming interface (API) calls 1412 through the software stack and receive messages 1414 in response to the API calls 1412, according to some implementations.

In various implementations, the operating system 1404 manages hardware resources and provides common services. The operating system 1404 includes, for example, a kernel 1420, services 1422, and drivers 1424. The kernel 1420 acts as an abstraction layer between the hardware and the other software layers in some implementations. For example, the kernel 1420 provides memory management, processor management (e.g., scheduling), component management, networking, and security settings, among other functionality. The services 1422 may provide other common services for the other software layers. The drivers 1424 may be responsible for controlling or interfacing with the underlying hardware. For instance, the drivers 1424 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

In some implementations, the libraries 1406 provide a low-level common infrastructure that may be utilized by the applications 1410. The libraries 1406 may include system libraries 1430 (e.g., C standard library) that may provide functions such as memory allocation functions, string manipulation functions, mathematic functions, and the like. In addition, the libraries 1406 may include API libraries 1432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 1406 may also include a wide variety of other libraries 1434 to provide many other APIs to the applications 1410.

The frameworks 1408 provide a high-level common infrastructure that may be utilized by the applications 1410, according to some implementations. For example, the frameworks 1408 provide various graphic user interface (GUI) functions, high-level resource management, high-level location services, and so forth. The frameworks 1408 may provide a broad spectrum of other APIs that may be utilized by the applications 1410, some of which may be specific to a particular operating system or platform.

In an example embodiment, the applications 1410 include a home application 1450, a contacts application 1452, a browser application 1454, a book reader application 1456, a location application 1458, a media application 1460, a messaging application 1462, a game application 1464, and a broad assortment of other applications such as a third party application 1466. According to some embodiments, the applications 1410 are programs that execute functions defined in the programs. Various programming languages may be employed to create one or more of the applications 1410, structured in a variety of manners, such as object-orientated programming languages (e.g., Objective-C, Java, or C++) or procedural programming languages (e.g., C or assembly language). In a specific example, the third party application 1466 (e.g., an application developed using the Android™ or iOS™ software development kit (SDK) by an entity other than the vendor of the particular platform) may be mobile software running on a mobile operating system such as iOS™, Android™ Windows® Phone, or other mobile operating systems. In this example, the third party application 1466 may invoke the API calls 1412 provided by the mobile operating system, such as the operating system 1404, to facilitate functionality described herein.

Example Machine Architecture and Machine-Readable Medium

Figure 15:
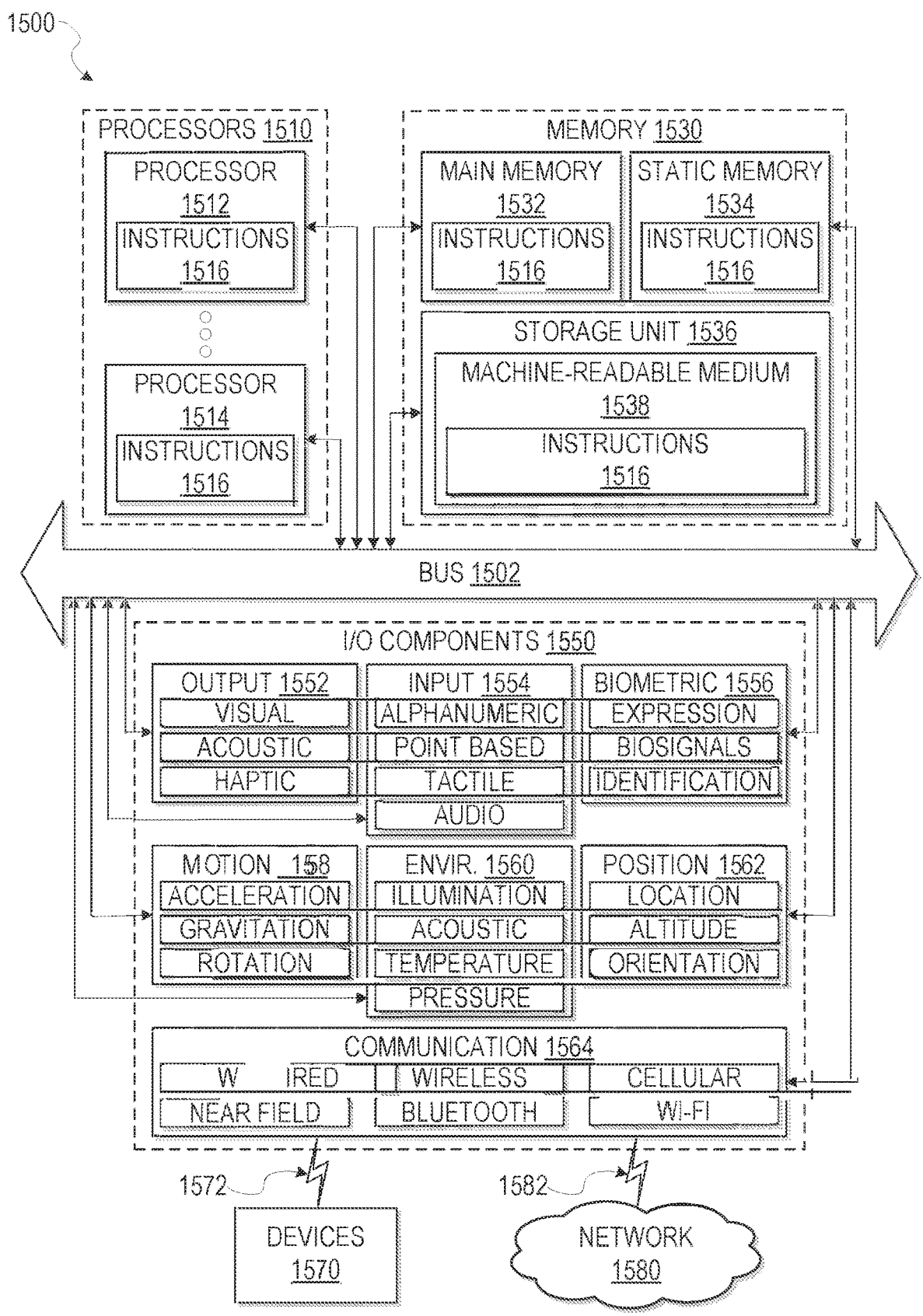
FIG. 15 is a diagrammatic representation of a machine in the form of a computer system within which a set of instructions may be executed for causing the machine to perform any one or more of the methodologies discussed herein, according to an example embodiment.

FIG. 15 is a block diagram illustrating components of a machine 1500, according to some example embodiments, able to read instructions from a machine-readable medium (e.g., a machine-readable storage medium) and perform any one or more of the methodologies discussed herein. Specifically, FIG. 15 shows a diagrammatic representation of the machine 1500 in the example form of a computer system, within which instructions 1516 (e.g., software, a program, an application, an applet, an app, or other executable code) for causing the machine 1500 to perform any one or more of the methodologies discussed herein may be executed. In alternative embodiments, the machine 1500 operates as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1516, sequentially or otherwise, that specify actions to be taken by the machine 1500. Further, while only a single machine 1500 is illustrated, the term "machine" shall also be taken to include a collection of machines 1500 that individually or jointly execute the instructions 1516 to perform any one or more of the methodologies discussed herein.

The machine 1500 may include processors 1510, memory 1530, and I/O components 1550, which may be configured to communicate with each other via a bus 1502. In an example embodiment, the processors 1510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1512 and a processor 1514 that may execute the instructions 1516. The term "processor" is intended to include multi-core processors that may comprise two or more independent processors (also referred to as "cores") that may execute instructions contemporaneously. Although FIG. 15 shows multiple processors, the machine 1500 may include a single processor with a single core, a single processor with multiple cores (e.g., a multi-core processor), multiple processors with a single core, multiple processors with multiple cores, or any combination thereof.

The memory 1530 may include a main memory 1532, a static memory 1534, and a storage unit 1536 accessible to the processors 1510 via the bus 1502. The storage unit 1536 may include a machine-readable medium 1538 on which are stored the instructions 1516 embodying any one or more of the methodologies or functions described herein. The instructions 1516 may also reside, completely or at least partially, within the main memory 1532, within the static memory 1534, within at least one of the processors 1510 (e.g., within the processor's cache memory), or any suitable combination thereof, during execution thereof by the machine 1500. Accordingly, in various implementations, the main memory 1532, the static memory 1534, and the processors 1510 are considered machine-readable media 1538.

As used herein, the term "memory" refers to a machine-readable medium 1538 able to store data temporarily or permanently and may be taken to include, but not be limited to, random-access memory (RAM), read-only memory (ROM), buffer memory, flash memory, and cache memory. While the machine-readable medium 1538 is shown in an example embodiment to be a single medium, the term "machine-readable medium" should be taken to include a single medium or multiple media (e.g., a centralized or distributed database, or associated caches and servers) able to store the instructions 1516. The term "machine-readable medium" shall also be taken to include any medium, or combination of multiple media, that is capable of storing instructions (e.g., instructions 1516) for execution by a machine (e.g., machine 1500), such that the instructions, when executed by one or more processors of the machine (e.g., processors 1510), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1550 include a wide variety of components to receive input, provide output, produce output, transmit information, exchange information, capture measurements, and so on. In general, it will be appreciated that the I/O components 1550 may include many other components that are not shown in FIG. 15. The I/O components 1550 are grouped according to functionality merely for simplifying the following discussion and the grouping is in no way limiting. In various example embodiments, the I/O components 1550 include output components 1552 and input components 1554. The output components 1552 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1554 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1550 include biometric components 1556, motion components 1558, environmental components 1560, or position components 1562, among a wide array of other components. For example, the biometric components 1556 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1558 include acceleration sensor components (e.g., accelerometer), gravitation sensor components, rotation sensor components (e.g., gyroscope), and so forth. The environmental components 1560 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1562 include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1550 may include communication components 1564 operable to couple the machine 1500 to a network 1580 or devices 1570 via a coupling 1582 and a coupling 1572, respectively. For example, the communication components 1564 include a network interface component or another suitable device to interface with the network 1580. In further examples, the communication components 1564 include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1570 may be another machine or any of a wide variety of peripheral devices (e.g., a peripheral device coupled via a USB).

Moreover, in some implementations, the communication components 1564 detect identifiers or include components operable to detect identifiers. For example, the communication components 1564 include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, Uniform Commercial Code Reduced Space Symbology (UCC RSS)-2D bar code, and other optical codes), acoustic detection components (e.g., microphones to identify tagged audio signals), or any suitable combination thereof. In addition, a variety of information can be derived via the communication components 1564, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 1580 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1580 or a portion of the network 1580 may include a wireless or cellular network and the coupling 1582 may be a Code Division Multiple Access (CDMA) connection, a Global System for Mobile communications (GSM) connection, or another type of cellular or wireless coupling. In this example, the coupling 1582 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1516 are transmitted or received over the network 1580 using a transmission medium via a network interface device (e.g., a network interface component included in the communication components 1564) and utilizing any one of a number of well-known transfer protocols (e.g., Hypertext Transfer Protocol (HTTP)). Similarly, in other example embodiments, the instructions 1516 are transmitted or received using a transmission medium via the coupling 1572 (e.g., a peer-to-peer coupling) to the devices 1570. The term "transmission medium" shall be taken to include any intangible medium that is capable of storing, encoding, or carrying the instructions 1516 for execution by the machine 1500, and includes digital or analog communications signals or other intangible media to facilitate communication of such software.

Furthermore, the machine-readable medium 1538 is non-transitory (in other words, not having any transitory signals) in that it does not embody a propagating signal. However, labeling the machine-readable medium 1538 as "non-transitory" should not be construed to mean that the medium is incapable of movement; the medium should be considered as being transportable from one physical location to another. Additionally, since the machine-readable medium 1538 is tangible, the medium may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   accessing data representative of a list of potential browse nodes, the list including at least a first potential browse node including a first set of items and a second potential browse node including a second set of items;
   determining a degree of overlap between the first set of items and the second set of items;
   determining that the degree of overlap is greater than a threshold degree of overlap; and
   based at least in part on the degree of overlap exceeding the threshold degree of overlap, generating a browse node by, at least in part, generating a uniform resource locator (URL) referencing the browse node and including a key-value pair associated with the second potential browse node.

2. The method of claim 1, wherein the generating the browse node further includes generating a title or header metatag indicating information about the browse node.

3. The method of claim 1, wherein the determining the degree of overlap is based at least in part on a count of the first set of items and the second set of items, a first percentage of the first set of items included in the second set of items, a second percentage of the second set of items included in the first set of items, or a combination thereof.

4. The method of claim 1, wherein the first potential browse node and the second potential browse node are associated with a same key-value pair.

5. The method of claim 1, wherein the first potential browse node and the second potential browse node are associated with a key-value pair, and the method further comprises:
   comparing a value of the key-value pair to a set of excluded values to determine that the value is not in the set of excluded values; and
   wherein the generating the browse node is further based at least in part on the determination that the value of the key-value pair is not in the set of excluded values.

6. The method of claim 1, wherein the first potential browse node and the second potential browse node are associated with a key-value pair, and the method further comprises:
   comparing a key of the key-value pair to a set of permitted keys to determine that the key is included in the set of permitted keys; and
   wherein the generating the browse node is further based at least in part on the determination that the key of the key-value pair is included in the set of permitted keys.

7. The method of claim 1, further comprising removing the first potential browse node from the list of potential browse nodes based at least in part on the degree of overlap exceeding the threshold degree of overlap.

8. A system comprising:
   one or more processors; and
   one or more memory devices storing instructions that, when executed by the one or more processors, cause the one or more processors to execute operations comprising:
      accessing data representative of a list of potential browse nodes, the list including at least a first potential browse node including a first set of items and a second potential browse node including a second set of items;

determining a degree of overlap between the first set of items and the second set of items;

determining that the degree of overlap is greater than a threshold degree of overlap; and based at least in part on the degree of overlap exceeding the threshold degree of overlap, generating a browse node by, at least in part, generating a uniform resource locator (URL) referencing the browse node and including a key-value pair associated with the second potential browse node.

9. The system of claim 8, wherein the generating the browse node further includes generating a title or header metatag indicating information about the browse node.

10. The system of claim 8, wherein the determining the degree of overlap is based at least in part on a count of the first set of items and the second set of items, a first percentage of the first set of items included in the second set of items, a second percentage of the second set of items included in the first set of items, or a combination thereof.

11. The system of claim 8, wherein the operations further comprise removing the first potential browse node from the list of potential browse nodes based at least in part on the degree of overlap exceeding the threshold degree of overlap.

12. The system of claim 8, wherein the first potential browse node and the second potential browse node are associated with a key-value pair, and the operations further comprise:

comparing a value of the key-value pair to a set of excluded values to determine that the value is not in the set of excluded values; and wherein the generating the browse node is further based at least in part on the determination that the value of the key-value pair is not in the set of excluded values.

13. The system of claim 8, wherein the first potential browse node and the second potential browse node are associated with a key-value pair, and the operations further comprise:

comparing a key of the key-value pair to a set of permitted keys to determine that the key is included in the set of permitted keys; and wherein the generating the browse node is further based at least in part on the determination that the key of the key-value pair is included in the set of permitted keys.

14. The system of claim 8, wherein the generating the browse node includes:

determining an image associated with an item of the second set of items;

selecting an image corresponding to the item; and associating the image with the browse node.

15. One or more non-transitory machine-readable storage medium comprising instructions that, when executed by one or more processors of a machine, cause the machine to perform operations comprising:

accessing data representative of a list of potential browse nodes, the list including at least a first potential browse node including a first set of items and a second potential browse node including a second set of items;

determining a degree of overlap between the first set of items and the second set of items;

determining that the degree of overlap is greater than a threshold degree of overlap; and based at least in part on the degree of overlap exceeding the threshold degree of overlap, generating a browse node by, at least in part, generating a uniform resource locator (URL) referencing the browse node and including a key-value pair associated with the second potential browse node.

16. The one or more non-transitory machine-readable storage medium of claim 15, wherein the generating the browse node further includes generating a title or header metatag indicating information about the browse node.

17. The one or more non-transitory machine-readable storage medium of claim 15, wherein the determining the degree of overlap is based at least in part on a count of the first set of items and the second set of items, a first percentage of the first set of items included in the second set of items, a second percentage of the second set of items included in the first set of items, or a combination thereof.

18. The one or more non-transitory machine-readable storage medium of claim 15, wherein the first potential browse node and the second potential browse node are associated with a same key-value pair.

19. The one or more non-transitory machine-readable storage medium of claim 15, wherein the first potential browse node and the second potential browse node are associated with a key-value pair, and the operations further comprise:

comparing a value of the key-value pair to a set of excluded values to determine that the value is not in the set of excluded values; and wherein the generating the browse node is further based at least in part on the determination that the value of the key-value pair is not in the set of excluded values.

20. The one or more non-transitory machine-readable storage medium of claim 15, wherein the first potential browse node and the second potential browse node are associated with a key-value pair, and the operations further comprise:

comparing a key of the key-value pair to a set of permitted keys to determine that the key is included in the set of permitted keys; and wherein the generating the browse node is further based at least in part on the determination that the key of the key-value pair is included in the set of permitted keys.

* * * * *